(12) United States Patent
Filippa

(10) Patent No.: US 9,685,847 B2
(45) Date of Patent: Jun. 20, 2017

(54) LINEAR MOTOR WITH ELECTROMAGNETICALLY ACTUATED SPRING MOVER

(71) Applicant: General Electric Company, Schenectady, NY (US)

(72) Inventor: Mariano Pablo Filippa, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 726 days.

(21) Appl. No.: 14/169,506

(22) Filed: Jan. 31, 2014

(65) Prior Publication Data
US 2015/0222165 A1    Aug. 6, 2015

(51) Int. Cl.
*H02K 33/02* (2006.01)
*H02K 33/00* (2006.01)
(Continued)

(52) U.S. Cl.
CPC ............. *H02K 33/02* (2013.01); *F04B 17/03* (2013.01); *F04B 17/04* (2013.01); *H02K 33/00* (2013.01);
(Continued)

(58) Field of Classification Search
CPC ........ H02K 33/02; H02K 33/00; H02K 33/04; H02K 33/06; H02K 33/08; H02K 33/10; H02K 33/12; H02K 33/14; H02K 33/16; H02K 33/18; H02K 35/00; H02K 41/02; H02K 41/00; H02K 41/025; H02K 41/03; H02K 41/031; H02K 41/033; H02K 41/0356; F04B 17/03; F04B 17/04

USPC ......... 310/12.01, 12.02, 12.03, 12.04, 12.05, 310/12.06, 12.07, 12.08, 12.09, 12.11, 310/12.12, 12.13, 12.14, 12.15, 21, 29, 32
See application file for complete search history.

(56) References Cited

U.S. PATENT DOCUMENTS 4,854,833 A * 8/1989 Kikuchi ................. H02K 33/02
                                                    417/417
5,734,209 A * 3/1998 Hallidy ................. E21B 43/128
                                                    310/12.04

(Continued)

OTHER PUBLICATIONS

"Magnetic Field to Compress a Spring." *Physics Forums*. Jun. 28, 2012. Web. Jan. 27, 2044.

*Primary Examiner* — Burton Mullins
*Assistant Examiner* — Alexander Singh
(74) *Attorney, Agent, or Firm* — Dority & Manning, P.A.

(57) ABSTRACT

Reluctance-based resonant linear motors and methods of operation are provided. An example linear motor includes a spring having a plurality of coils. The linear motor includes a stator coaxially surrounding at least a portion of the spring. The stator includes a plurality of teeth. The linear motor includes a plurality of windings respectively positioned within a plurality of winding cavities respectively formed by the plurality of teeth. The application of electrical energy to the plurality of windings generates a magnetic field that flows through one or more of the coils of the spring. The flow of the magnetic field through the one or more coils of the spring causes the spring to actuate towards a compressed position. An example method includes periodically applying electrical energy to the plurality of windings such that the spring oscillates at a resonance frequency associated with the linear motor.

16 Claims, 4 Drawing Sheets

(51) Int. Cl.
*H02K 41/00* (2006.01)
*H02K 41/02* (2006.01)
*F04B 17/03* (2006.01)
*F04B 17/04* (2006.01)
*H02K 33/04* (2006.01)

(52) U.S. Cl.
CPC ............ *H02K 33/04* (2013.01); *H02K 41/00* (2013.01); *H02K 41/02* (2013.01)

(56) References Cited

U.S. PATENT DOCUMENTS

| | | | |
|---|---|---|---|
| 6,462,439 B1 | 10/2002 | Denne | |
| 7,750,513 B2* | 7/2010 | Witte | H02K 9/20 |
| | | | 310/12.01 |
| 2001/0048250 A1* | 12/2001 | Ohta | H02K 41/0356 |
| | | | 310/12.04 |
| 2009/0015110 A1* | 1/2009 | Asano | H02K 1/148 |
| | | | 310/12.04 |

* cited by examiner

LINEAR MOTOR WITH ELECTROMAGNETICALLY ACTUATED SPRING MOVER

FIELD OF THE INVENTION

The present disclosure relates generally to linear motors. More particularly, the present disclosure is directed to reluctance-based resonant linear motors.

BACKGROUND OF THE INVENTION

Linear motors are a form of electric motors in which electrical energy is used to drive a motor component in one or more linear directions. For example, many existing linear motors generate a magnetic field which influences one or more permanent magnets to move in the linear directions.

Alternatively, the permanent magnets can be fixed in a certain position and the component that generates the magnetic field (e.g. an armature including windings) can move as a result of the magnetic forces.

However, both of the above noted designs require the linear motor to include one or more permanent magnets, which are relatively expensive components. For example, various industrial processes must be performed to create and shape permanent magnets of sufficient strength and quality for use within a linear motor.

Further, certain permanent magnets can be formed from rare earth elements or other materials of limited global quantity or commercial availability. As such, high quality permanent magnets can significantly contribute to the cost associated with producing a linear motor.

Therefore, linear motors that do not rely upon permanent magnets for operation are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a linear motor. The linear motor includes a spring having a plurality of coils. The linear motor includes a stator coaxially surrounding at least a portion of the spring. The stator includes a plurality of teeth. The linear motor includes a plurality of windings respectively positioned within a plurality of winding cavities respectively formed by the plurality of teeth. The application of electrical energy to the plurality of windings generates a magnetic field that flows through one or more of the coils of the spring. The flow of the magnetic field through the one or more coils of the spring causes the spring to actuate towards a compressed position.

Another aspect of the present disclosure is directed to a linear motor. The linear motor includes a spring having a plurality of coils. A plurality of air gaps respectively exist between the plurality of coils when the spring is in an uncompressed position. The linear motor includes a stator surrounding at least a portion of the spring. The linear motor includes a plurality of windings respectively positioned within a plurality of winding cavities spaced along a longitudinal axis of the stator. Application of electrical energy to the plurality of windings generates a magnetic field that flows through one or more of the plurality of coils. The flow of the magnetic field through the one or more of the plurality of coils actuates the spring towards a compressed position in which the plurality of air gaps are reduced, thereby reducing the reluctance experienced by the magnetic field.

Another aspect of the present disclosure is directed to a method of operating a linear motor. The method includes providing the linear motor. The linear motor includes a spring having a plurality of coils. The linear motor includes a stator coaxially surrounding at least a portion of the spring. The stator includes a plurality of teeth. The linear motor includes a plurality of windings respectively positioned within a plurality of winding cavities respectively formed by the plurality of teeth. The method includes applying electrical energy to the plurality of windings to generate a magnetic field that flows through one or more of the coils of the spring. The flow of the magnetic field through the one or more coils of the spring causes the spring to actuate towards a compressed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
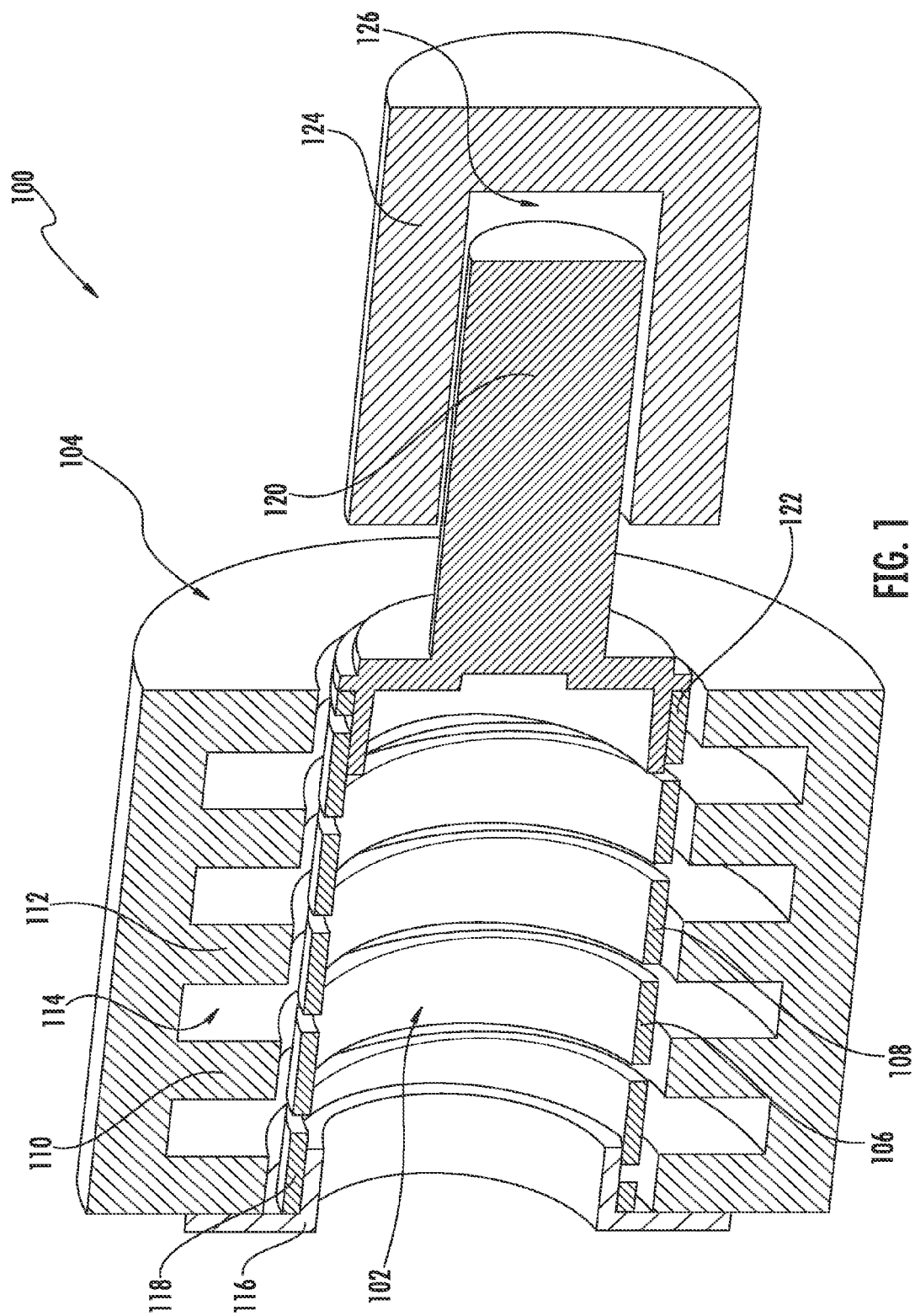
FIG. 1 depicts a cross-sectional view of an example linear motor according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the FIGS., example embodiments of the present disclosure will be discussed in further detail. FIG. 1 depicts a cross-sectional view of an example linear motor 100 according to an example embodiment of the present disclosure.

Linear motor 100 can include a spring 102 and a stator 104. Spring 102 can include a plurality of coils, such as, for example, coils 106 and 108. More particularly, spring 102 can be one continuous piece of helical material and the plurality of coils can serve as spatial designations for particular portions of spring 102. For example, each full rotation of spring 102 can be designated as a coil.

Stator 104 can surround at least a portion of spring 102. For example, stator 104 can be generally cylindrical in shape and can coaxially surround spring 102 along a longitudinal axis of spring 102 and stator 104, as shown in FIG. 1.

Stator 104 can include a plurality of teeth, such as, for example, teeth 110 and 112. In some implementations, the plurality of teeth of stator 104 can be generally annular teeth that project from stator 104 inwards towards spring 102. For example, as shown in FIG. 1, the plurality of teeth of stator 104 can be spaced at identical intervals along the longitudinal axis of stator 104. However, non-identical intervals can be used. The plurality of teeth can be identical or non-identical in nature and can have various spatial features that improve performance.

The plurality of teeth of stator 104 can respectively form a plurality of winding cavities in stator 104. In particular, each pair of two teeth can form one of the plurality of winding cavities. As an example, teeth 110 and 112 can form a winding cavity 114. The plurality of winding cavities can be spaced at intervals along the longitudinal axis of stator 104. A plurality of windings (not shown) can be respectively positioned within the plurality of winding cavities.

A first end of spring 102 can be secured in place with respect to a first end of stator 104. For example, a first coil 118 of spring 102 can be secured to base 116. For example, first coil 118 can be secured to base 116 by force fitting, welding, screws, adhesive, or any other suitable form of attachment. Likewise, base 116 can be secured to stator 104 in any suitable manner.

A piston 120 can be secured to a second end of spring 102, as shown in FIG. 1. For example, piston 120 can be secured to a final coil 122 of spring 102 by force fitting, welding, screws, adhesive, or any other suitable form of attachment. In other implementations, piston 120 is secured to the spring 102 in fashions other than connection to final coil 122.

According to an aspect of the present disclosure, electrical energy can be applied to the plurality of windings to create a magnetic field that flows through one or more of the plurality of coils of spring 102. As will be discussed further later, the flow of the magnetic field through the coils of spring 102 will cause spring 102 to actuate towards a compressed position. Upon disapplication of the electrical energy, the spring will naturally return to the uncompressed position.

Thus, according to another aspect of the present disclosure, electrical energy can be applied to the plurality of windings in a periodic fashion so that spring 102 is driven in an oscillating manner. For example, various voltage waveforms can be applied to that the spring 102 oscillates at a resonant frequency associated with the linear motor (e.g. a resonant frequency associated with the spring/piston assembly).

Thus, linear motor 120 can be operated so that spring 102 oscillates back and forth (e.g. compresses and decompressed) along its longitudinal axis. As a result, piston 120 can be driven into a chamber 126 of a cylinder 124.

In some embodiments, linear motor 100 can be operated to drive piston 120 into chamber 126 in order to compress a gas. Therefore, cylinder 124 can include various components that are not shown in FIG. 1, such as, for example, an inlet valve and an outlet valve.

It will be appreciated that linear motor 100 of FIG. 1 is provided as an example for the purpose of explaining the present disclosure. Therefore, the present disclosure is not limited to the particular shapes, sizes, spatial relationships, or functions shown in FIG. 1.

Figure 2:
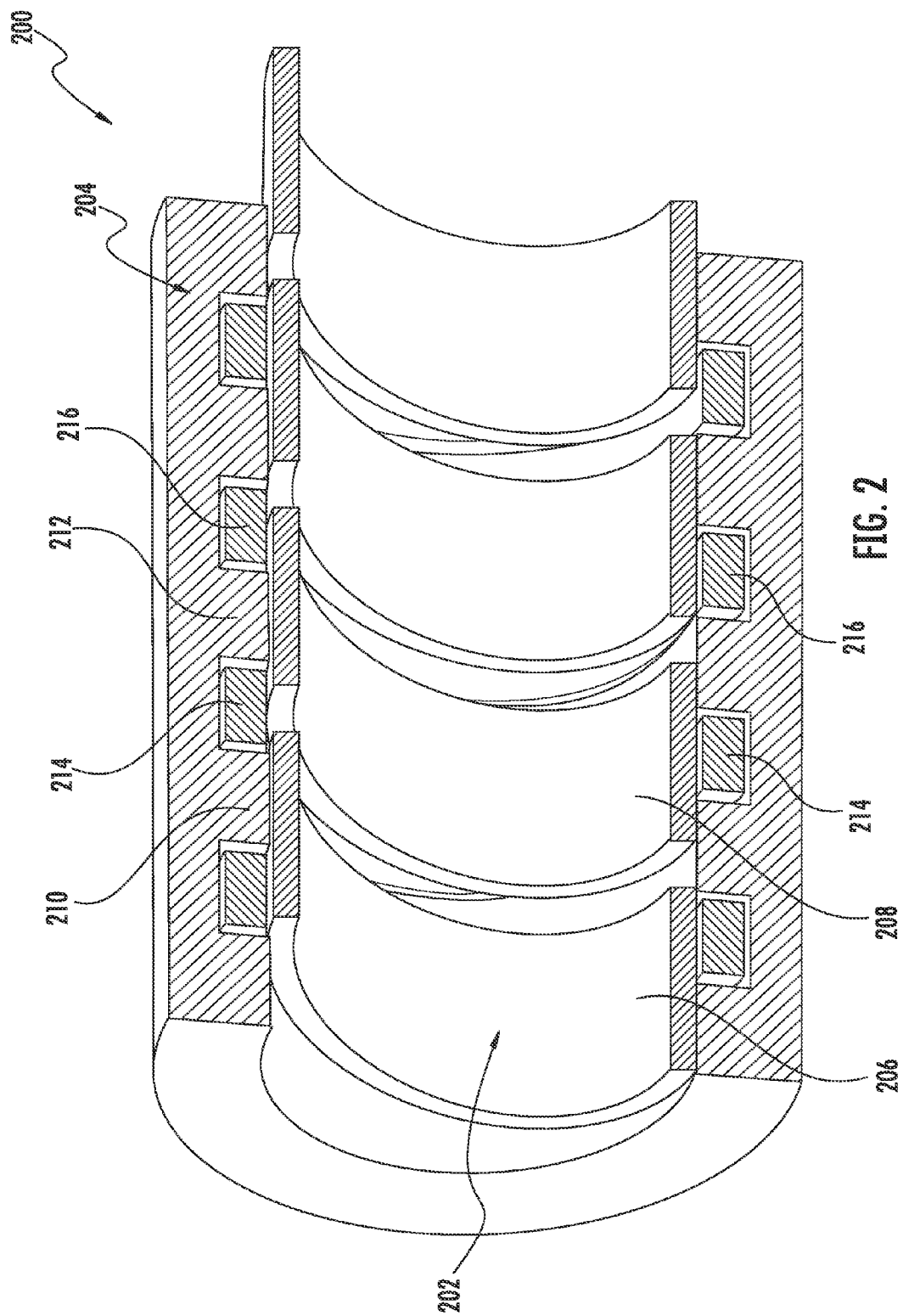
FIG. 2 depicts a cross-sectional view of an example linear motor according to an example embodiment of the present disclosure.

FIG. 2 depicts a cross-sectional view of an example linear motor 200 according to an example embodiment of the present disclosure.

Linear motor 200 can include a spring 202 and a stator 204. Spring 202 can include a plurality of coils, such as, for example, coils 206 and 208. More particularly, spring 202 can be one continuous piece of helical material and the plurality of coils can serve as spatial designations for particular portions of spring 202. For example, each full rotation of spring 202 can be designated as a coil.

Stator 204 can surround at least a portion of spring 202. For example, stator 204 can be generally cylindrical in shape and can coaxially surround spring 202 along a longitudinal axis of spring 202 and stator 204, as shown in FIG. 2.

Stator 204 can include a plurality of teeth, such as, for example, teeth 210 and 212. In some implementations, the plurality of teeth of stator 204 can be generally annular teeth that project from stator 204 inwards towards spring 202. For example, as shown in FIG. 2, the plurality of teeth of stator 204 can be spaced at identical intervals along the longitudinal axis of stator 204. However, non-identical intervals can be used. The plurality of teeth can be identical or non-identical in nature and can have various spatial features that improve performance.

A plurality of windings, such as, for example, windings 214 and 216, can be respectively positioned within a plurality of winding cavities respectively formed by the plurality of teeth of stator 204. In particular, each pair of two teeth can form one of the plurality of winding cavities. As an example, teeth 110 and 112 can form a winding cavity into which winding 214 is positioned.

The plurality of windings can be spaced at identical or non-identical intervals along the longitudinal axis of stator 104. Each of the plurality of windings can be formed from multiple turns of a conductor through the winding cavity. In some implementations, the plurality of windings can have alternating winding directions.

Figure 3:
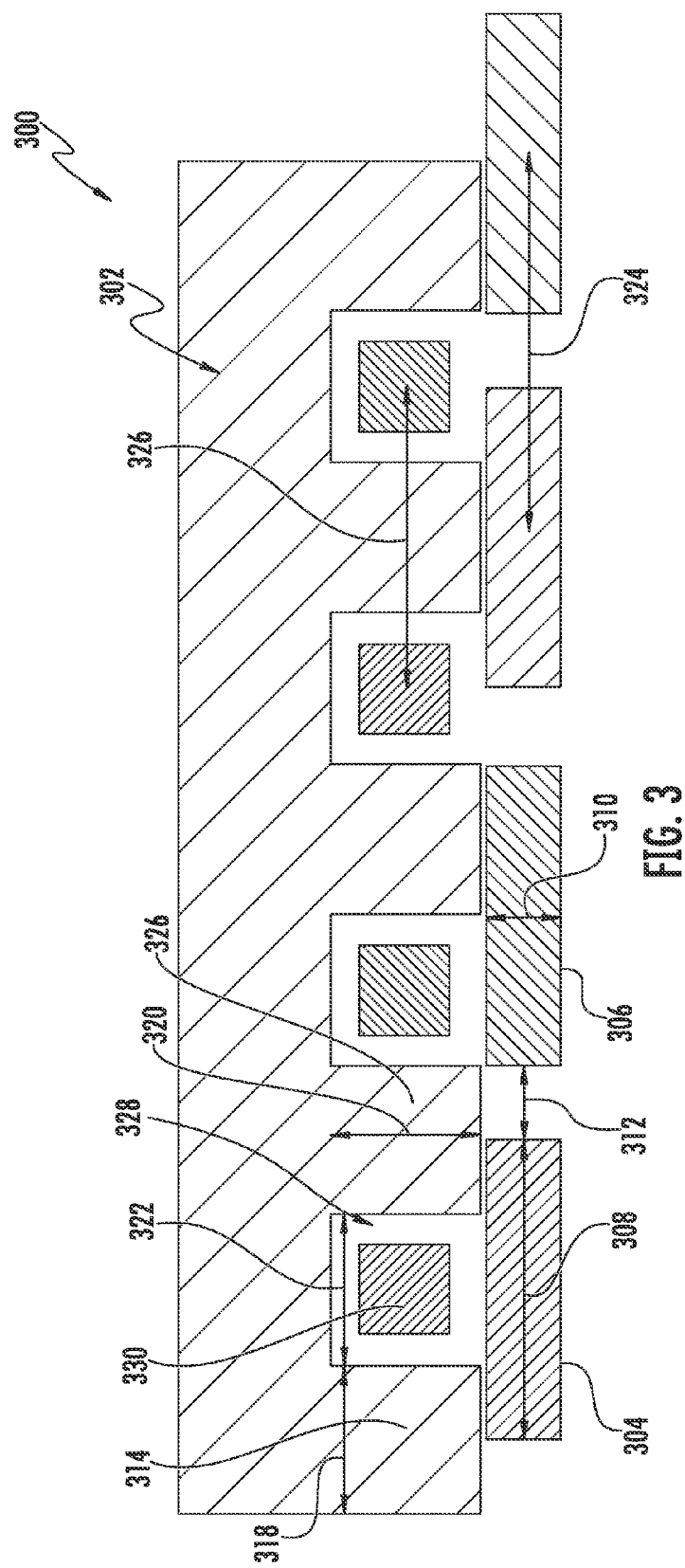
FIG. 3 depicts a simplified diagram of a portion of an example linear motor according to an example embodiment of the present disclosure.

FIG. 3 depicts a simplified diagram of a portion of an example linear motor 300 according to an example embodiment of the present disclosure.

Linear motor 300 can include a spring and a stator 302. The spring can include a plurality of coils, such as, for example, coils 304 and 306.

As shown in FIG. 3, the coils 304 and 306 can have a rectangular cross-sectional area. For example, each coil can have a coil length (e.g. length 308 of coil 304) and a coil width (e.g. width 310 of coil 306). The length and width of each coil can be adjusted to meet various design parameters. Furthermore, coils having other cross-sectional shapes can be used as well, including, for example, circular, oval, crescent, abstract, or other suitable shapes.

An air gap can be present between each pair of coils when the spring is in an uncompressed position. For example, air gap 312 can exist between coils 304 and 306 when the spring is uncompressed. As such, the spring can have an uncompressed pitch 324 between the centers of each pair of adjacent coils.

Stator 302 can include a plurality of teeth, such as, for example, teeth 314 and 316. For example, each tooth can have a tooth length (e.g. length 318 of tooth 314) and a tooth width (e.g. width 320 of tooth 316). The length and width of each tooth can be adjusted to meet various design parameters. Furthermore, other teeth having other cross-sectional shapes can be used as well.

The plurality of teeth can respectively form a plurality of winding cavities, such as, for example, winding cavity 328. Each winding cavity can have length (e.g. length 322 of cavity 328.

A winding can be positioned within each winding cavity, such as, for example, winding 330. A winding interval can exist between each pair of windings. For example, winding interval 326 is the distance between the centers of a pair of adjacent windings.

In some implementations, the uncompressed pitch of the spring can be greater than the winding interval. For example, uncompressed pitch 324 can be a greater distance than winding interval 326. In such fashion, the spring can compress so that the compressed pitch of the spring equals the winding interval. However, any suitable relationship between uncompressed pitch, compressed pitch, and winding interval can be used. In other implementations, the coil length can equal the winding interval.

In yet other implementations, the first coil of the spring can be aligned with the first winding of the motor. For example, as shown in FIG. 3, coil 304 can be generally aligned with winding 330.

Figure 4A:
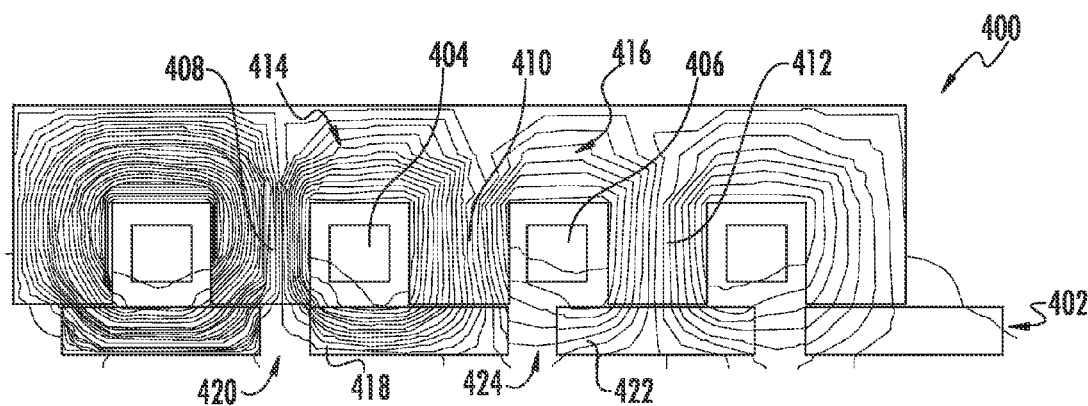
FIGS. 4A-4C depict simplified diagrams of the operation of an example linear motor according to an example embodiment of the present disclosure.
Figure 4B:
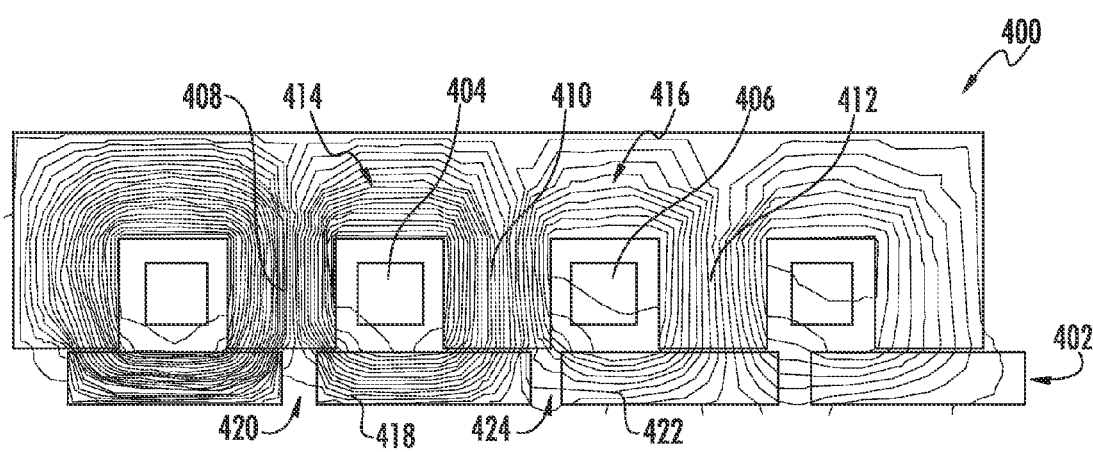
Figure 4C:
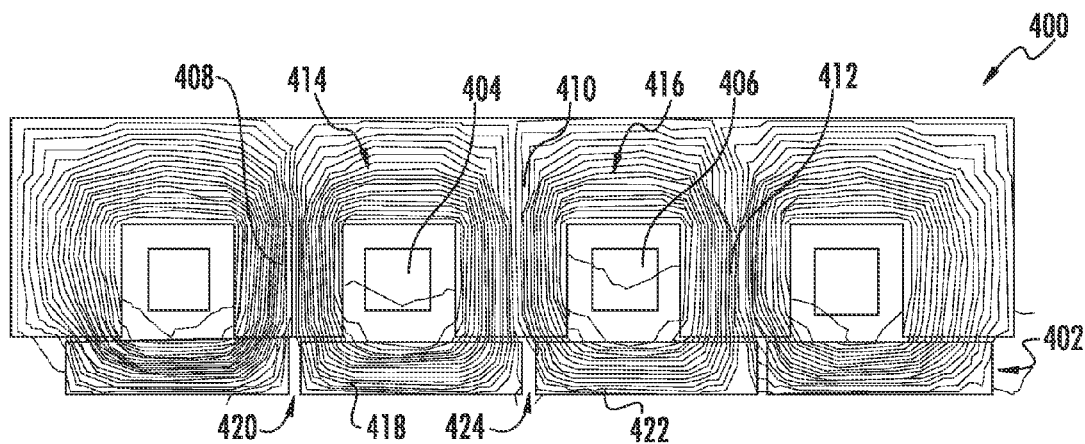

FIGS. 4A-4C depict simplified diagrams of the operation of an example linear motor 400 according to an example embodiment of the present disclosure. In particular, FIGS. 4A-4C depict a spring 402 of motor 400 actuating into a compressed position over time due to the magnetic forces of a magnetic field generated by the windings of motor 400.

More particularly, a plurality of windings can be included in linear motor 400, including, for example, windings 404 and 406. Application of electrical energy to the plurality of windings can generate a magnetic field that flows through one or more of the coils of the spring 402. The flow of the magnetic field through the one or more coils of the spring 402 causes the spring 402 to actuate towards a compressed position, in order to reduce the reluctance experienced by the magnetic field.

Thus, the spring 402 and its associated air gaps can provide a first amount of reluctance to the magnetic field when the spring is in an uncompressed position and a second amount of reluctance to the magnetic field when the spring is in the compressed position. The first amount can be greater than the second amount, such that the flow of the magnetic field through the one or more coils of the spring results in magnetic forces that cause the spring to actuate towards the compressed position, thereby minimizing system reluctance.

As an example, application of the electrical energy to the plurality of windings respectively can generate a plurality of flux loops. Each of the plurality of flux loops can flow through two of the plurality of teeth.

For example, application of electrical energy to winding 404 can generate a flux loop 414 that flows through teeth 408 and 410. Flux loop 414 can be closed through a coil 418 of spring 402 and an air gap 420.

Likewise, application of electrical energy to winding 406 can generate a flux loop 416 that flows through teeth 410 and 412. Flux loop 416 can be closed through a coil 422 of spring 402 and an air gap 424. In the event that windings 404 and 406 have alternating winding directions, flux loops 414 and 416 can have opposite rotational directions, as shown in FIGS. 4A-4C.

As is illustrated by FIGS. 4A-4C, the flow of the magnetic field through the coils of spring 402 (e.g. coils 418 and 422) will cause the spring 402 to compress, so that the air gaps between the coils (e.g. air gaps 420 and 424) will be reduced. By reducing the air gaps, the reluctance provided by the spring 402 to the magnetic field will be reduced as the coil material has much lower reluctance than air. Reducing the reluctance can result in increased magnetic flux, as illustrated in FIGS. 4A-4C.

Thus, application of electrical energy to the windings of linear motor 400 can cause spring 402 to actuate towards a compressed position. When application of electrical energy is discontinued, the spring will actuate back towards the uncompressed position.

As such, according to an aspect of the present disclosure electrical energy can be periodically applied to the plurality of windings to generate a magnetic field that causes the spring to oscillate at a resonant frequency associated with the linear motor. In general, the resonant frequency associated with the linear motor can be a function of a spring constant associated with the spring and also the mass of any components attached to the spring, such as, for example, a piston. Therefore, the resonant frequency associated with the linear motor will change based on various design parameters.

In some embodiments, the linear motor can be driven at the resonant frequency by applying to the plurality of windings a sinusoidal voltage waveform having a frequency that is equal to one-half the resonant frequency associated with the linear motor.

In other embodiments, the linear motor can be driven at the resonant frequency by applying to the plurality of windings a square voltage waveform having a frequency that is equal to the resonant frequency associated with the linear motor. However, other voltage waveforms can be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear motor comprising:
    a spring having a plurality of coils;
    a stator coaxially surrounding at least a portion of the spring, wherein the stator comprises a plurality of teeth; and
    a plurality of windings respectively positioned within a plurality of winding cavities respectively formed by the plurality of teeth, an uncompressed pitch of the spring being greater than a winding interval between each of the plurality of windings;
    wherein application of electrical energy to the plurality of windings generates a magnetic field that flows through one or more of the coils of the spring; and
    wherein the flow of the magnetic field through the one or more coils of the spring causes the spring to actuate towards a compressed position.

2. The linear motor of claim 1, wherein:
    application of the electrical energy to the plurality of windings respectively generates a plurality of flux loops;

the spring is positioned within the stator such that a substantial portion of each of the plurality of flux loops flows through one or more of the coils of the spring; and the flow of each of the plurality of flux loops through the respective one or more of the coils of the spring causes the spring to actuate towards the compressed position.

3. The linear motor of claim 1, wherein:

the spring provides a first amount of reluctance to the magnetic field when the spring is in an uncompressed position;

the spring provides a second amount of reluctance to the magnetic field when the spring is in the compressed position; and the first amount is greater than the second amount, such that the flow of the magnetic field through the one or more coils of the spring results in magnetic forces that cause the spring to actuate towards the compressed position, thereby minimizing system reluctance.

4. The linear motor of claim 1, wherein a first end of the spring is secured in place with respect to a first end of the stator.

5. The linear motor of claim 4, wherein the first end of the spring is aligned with the winding cavity most proximate to the first end of the stator.

6. The linear motor of claim 1, wherein the plurality of teeth comprise a plurality of annular teeth spaced at intervals along a longitudinal axis of the stator and extending inwards towards the spring.

7. The linear motor of claim 1, wherein the plurality of windings have alternating winding directions.

8. The linear motor of claim 1, wherein:

application of the electrical energy to the plurality of windings respectively generates a plurality of flux loops; and each of the plurality of flux loops flows through two of the plurality of teeth.

9. The linear motor of claim 1, further comprising a piston driven by the spring.

10. The linear motor of claim 9, further comprising a cylinder having a chamber into which the piston is driven to compress a gas.

11. The linear motor of claim 1, wherein the plurality of coils respectively have a generally rectangular cross-sectional area.

12. A linear motor comprising:

a spring having a plurality of coils, wherein a plurality of air gaps respectively exist between the plurality of coils when the spring is in an uncompressed position;

a generally cylindrical stator surrounding at least a portion of the spring; and a plurality of windings respectively positioned within a plurality of winding cavities spaced along a longitudinal axis of the stator, wherein a pitch of the spring is greater than a winding interval between each of the plurality of windings;

wherein application of electrical energy to the plurality of windings generates a magnetic field that flows through one or more of the plurality of coils; and wherein the flow of the magnetic field through the one or more of the plurality of coils actuates the spring towards a compressed position in which the plurality of air gaps are reduced, thereby reducing the reluctance experienced by the magnetic field.

13. The linear motor of claim 12, wherein:

application of electrical energy to the plurality of windings respectively generates a plurality of flux loops having alternating rotational directions;

the spring is positioned within the stator such that a substantial portion of each of the plurality of flux loops flows through one or more of the coils of the spring; and the flow of each of the plurality of flux loops through the respective one or more coils of the spring actuates the spring towards the compressed position in which the plurality of air gaps are reduced, thereby reducing the reluctance experienced by each of the plurality of flux loops.

14. The linear motor of claim 13, wherein:

the plurality of winding cavities are respectively formed by a plurality of pairs of teeth extending from the stator inwards towards the spring; and the flux loop generated by each winding flows through the stator and the pair of teeth forming the winding cavity.

15. A method of operating a linear motor, the method comprising:

providing the linear motor, wherein the linear motor comprises:

a spring having a plurality of coils;

a stator coaxially surrounding at least a portion of the spring, wherein the stator comprises a plurality of teeth; and a plurality of windings respectively positioned within a plurality of winding cavities respectively formed by the plurality of teeth; and applying electrical energy to the plurality of windings to generate a magnetic field that flows through one or more of the coils of the spring, wherein applying electrical energy to the plurality of windings to generate the magnetic field comprises applying to the plurality of windings a sinusoidal voltage waveform having a frequency that is equal to one-half a resonant frequency associated with the linear motor;

wherein the flow of the magnetic field through the one or more coils of the spring causes the spring to actuate towards a compressed position.

16. The method of claim 15, wherein applying electrical energy to the plurality of windings to generate the magnetic field comprises applying to the plurality of windings a square voltage waveform having a frequency that is equal to a resonant frequency associated with the linear motor.

\* \* \* \* \*